July 8, 1958 C. O. BROWN ET AL 2,842,180
SELF-LOCKING THREADS WITH LOCKING INTERFERENCE FIT
Original Filed Feb. 23, 1950 2 Sheets-Sheet 1
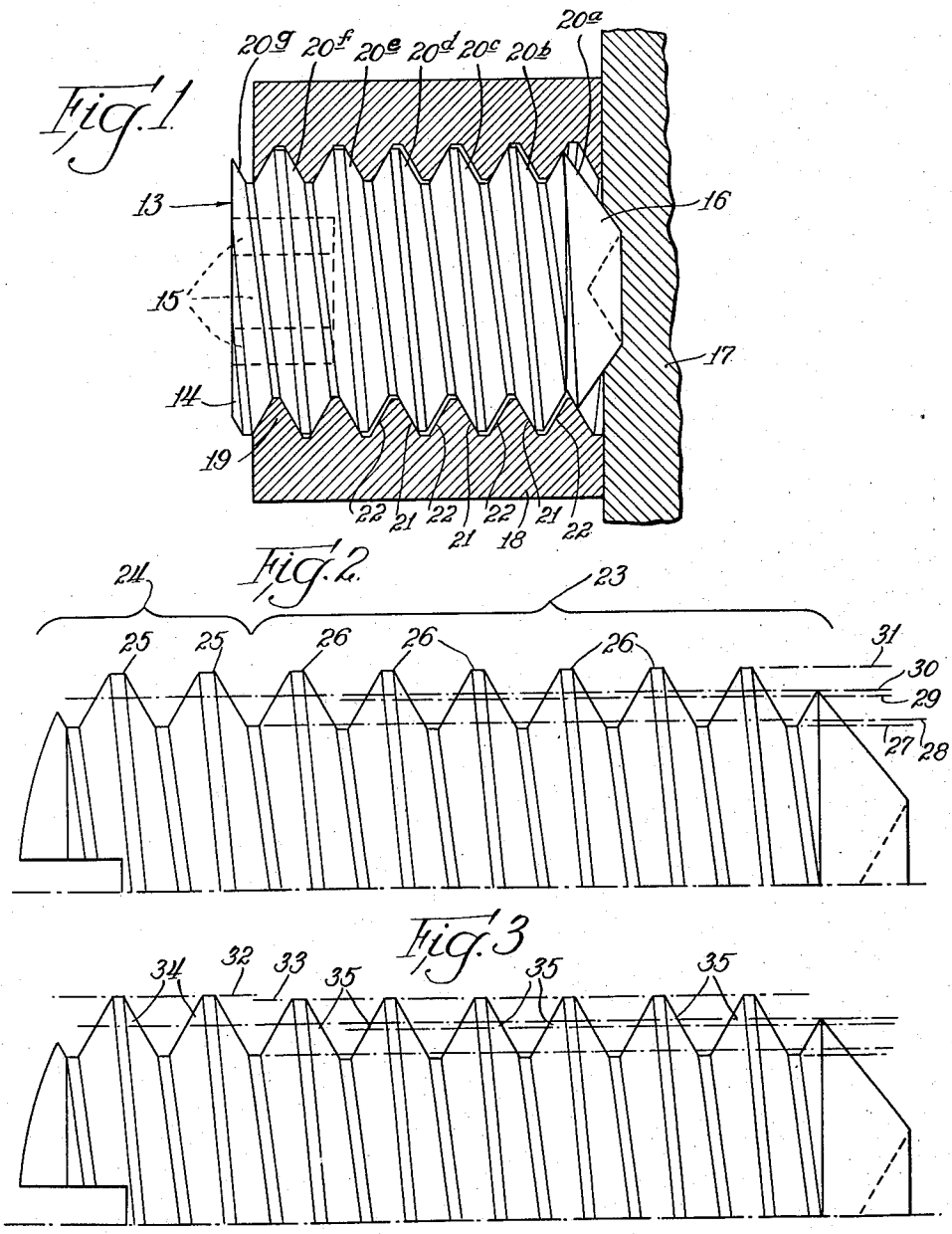
INVENTORS:
Calvin O. Brown
BY X. Raymond Dodge
John A. Watson
Atty.

July 8, 1958  C. O. BROWN ET AL  2,842,180
SELF-LOCKING THREADS WITH LOCKING INTERFERENCE FIT
Original Filed Feb. 23, 1950  2 Sheets-Sheet 2
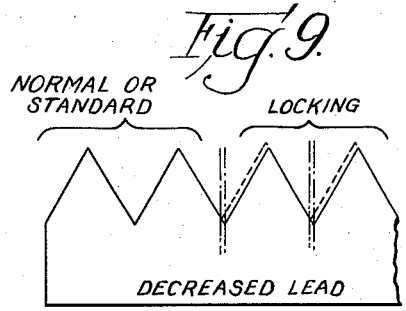
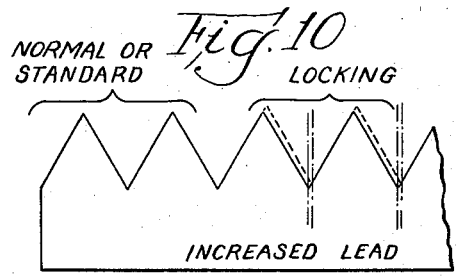
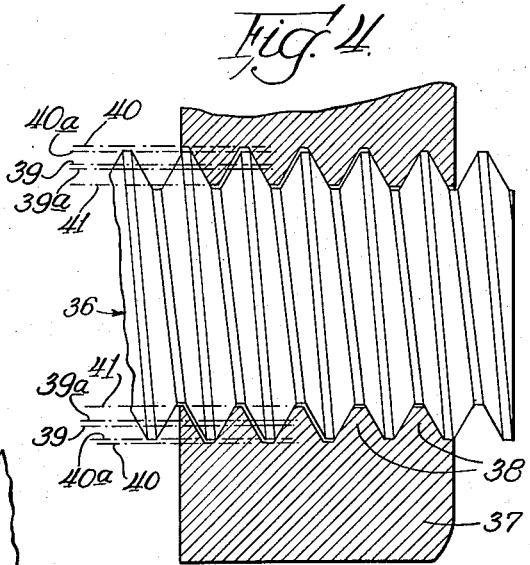
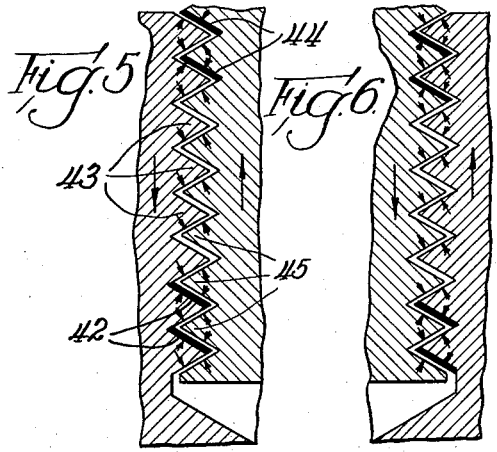
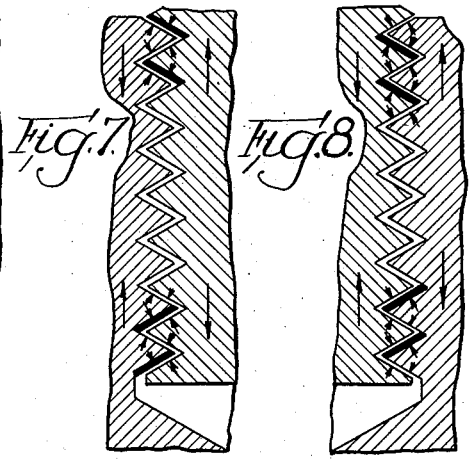
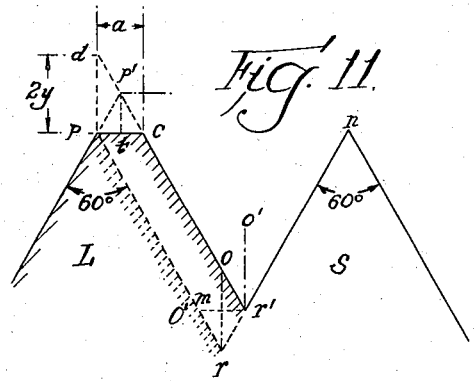
INVENTORS:
Calvin O. Brown
BY X. Raymond Dodge
John A. Watson
Atty.

United States Patent Office 2,842,180
Patented July 8, 1958

2,842,180
SELF-LOCKING THREADS WITH LOCKING INTERFERENCE FIT

Calvin O. Brown, Bartlett, and X. Raymond Dodge, Hinsdale, Ill., assignors, by mesne assignments, to Set Screw & Mfg. Company, Bartlett, Ill., a corporation of Illinois Continuation of application Serial No. 145,854, February 23, 1950. This application October 20, 1953, Serial No. 387,113

1 Claim. (Cl. 151—22)

This invention pertains to screw threads for bolts, studs, plugs, nuts and lock-nuts, screws, set-screws, adjusting screws, pipe threads, tube threads, and other threaded articles and products, wherein it is desired to effect a friction grip or locking action thereby to secure the threaded article whether it be a bolt, screw, nut or other threaded item or device, in a fixed or adjusted position. While the invention will be described and illustrated herein, in its application to set-screws and nuts, and to studs and threaded bores in blocks and the like, it is to be understood that such disclosure is purely for illustrative purposes and in no sense by way of limitation. The principles and features involved, however, are peculiarly adapted to set-screws, locking screws, adjusting screws, studs, threaded bores and nuts for self-locking use. A copending application, Ser. No. 485,630, filed February 2, 1955 and now abandoned, as a continuation of application Serial No. 145,854 filed February 23, 1950, entitled "Self-Locking Threads," and now abandoned, contains claims to the external lock thread as well as claims generic to the species disclosed and claimed herein. The present application is a continuation of the application Serial No. 145,854, now abandoned, and also copending therewith.

Throughout the description and claim hereof the terms and expressions which are applied or used with reference to screw threads and products of various sorts employing threads, except as the context otherwise requires or as specifically indicated, are to be considered as having the meanings or definitions given in National Bureau of Standards Handbook H-28 (1944) entitled "Screw-Thread Standards for Federal Services, 1944," published (issued) February 17, 1945, by the U. S. Government Printing Office, Washington, D. C.; see pages one to twenty-eight, inclusive, thereof in particular. However, it should be understood that it is not intended by the adoption and use of such meanings or definitions to restrict the invention as disclosed and claimed herein, to screw threads and threaded products approved or used by the United States Government or as listed in the aforesaid "Handbook," since the invention is applicable to various screw threads and threaded products of both domestic and foreign design not embraced within the specifications or approval of the United States Government nor included in the said "Handbook."

It is also to be observed and recognized, particularly with respect to interpretation of the description and the appended claim that while some of the terms and expressions defined in the aforesaid "Handbook" are applicable to both female threads (internal as in a nut) and to male threads (external as on a screw or bolt), those terms may have different significance or meaning as between male and female threads. For instance, by definition in said "Handbook," the major or crest diameter of a male thread as on a screw, corresponds, roughly, to the major or root diameter of the thread in a nut fitting said screw, and the minor or root diameter of the thread of the screw will correspond, roughly, with the minor or crest diameter of the thread in the nut. By reason of that fact and by reason of the nature or certain characteristics of the invention, as will become apparent, it is difficult if not impossible to define the invention, in certain of its more detailed phases, in terms at once generic to both male and female threaded members although the application of the invention may be the same in both cases where the threads are designed to mate with one another. Therefore, the invention may be defined in one claim herein in its application to a female threaded member and in another claim in its application to a male threaded member although the scope of the two claims, otherwise, may be substantially identical.

Considerations of a practical nature render it impractical or impossible to form threads exactly as theory suggests. Whereas, for instance, it would be desirable to have the thread of one of a pair of mating members the exact complement of the thread of the other so that the flanks or sides of the thread of one member make complete surface contact, from root to peak or crest, with the adjacent thread flanks or sides of the mating member throughout the entire helix of the thread, such condition seldom is attained in practice. There are, of course, numerous types of thread and particular thread specifications for almost any type but most specifications for practically all types permit some variation or tolerance within a particular type, fit class and size. Furthermore, the crests and roots of most threads are truncated to provide a narrow flat across the crest and a similar narrow flat across the bottom of each valley or at the root since it is not practical to form smooth, clean and even "sharp" crests and valleys or roots. Therefore, the invention is disclosed herein in its application to the more usual and ordinary types of thread and to fit classes 1, 2 and 3, of the five classes recognized in the above mentioned "Handbook," wherein its utility will be most clearly apparent.

It is a well recognized fact that vibration, expansion and contraction, and other forces cause or tend to cause screws, bolts, nuts, etc., to loosen from their set positions. Various attempts have been made to provide what may be termed "self-locking" set-screws, nuts, etc., including the oversize thread, the interrupted thread, the broken thread, the expanding thread and head, the eccentric thread and like expedients, but few of such attempts have been entirely successful under varying conditions of use and in many if not most cases, the expense of the special manufacture has made the resulting article relatively prohibitive for ordinary use. Lock-washers, double nut locks, and "peening" or "staking" are other methods and means commonly employed to secure "screws, nuts, bolts, and the like" in set or adjusted positions yet not one such expedient is universally applicable or practical or successful and in many instances cost or other reasons, mechanical or financial, make the employment of such methods or devices completely impractical.

One of the principal objects of the invention, therefore, is to provide a self-locking thread for threaded articles or members including those articles and members mentioned above, of such character as to be readily formed by any of the several usual thread forming processes including but not limited to rolling, tapping, or die-cutting, chasing, grinding, etc., but requiring no particularly special tooling or processing such as required for broken, interrupted and offset threads, split or expansible heads or shanks and other forms of so called "self-locking" bolts, screws, nuts and the like, as heretofore proposed.

Another principal object is to provide a thread for an article or member such as those mentioned which may be employed to effect a liquid or gas-tight seal even without sealing compounds or packing materials.

Still another important object is to provide a novel type of thread wherein there is a locking or sealing thread portion or section and what may be termed a "normal" or standard thread portion, the turn length or turns of either or both of which portions or sections may be of any predetermined dimension or, if desired, wherein there may be several locking or sealing portions separated or bordered by a "normal" or "standard" thread portion or portions or by any unthreaded portion or portions.

Among the many additional objects of the invention are the provision of a thread which may be employed to mate with "normal" or "standard" threads of conformable type, which will not damage or deform a mating thread, which may be employed or used for a relatively infinite number of times in connection with a mating thread with substantially no material loss of locking or securing efficiency, which may be produced on a commercial scale with standard tools and equipment, which may be applied to its ultimate use with standard tools and ordinary skill, which may be so made as to provide a substantial range of locking friction for various types of mating threads and thread and thread fit classes for various uses, and which may be applicable to a wide variety of materials and articles including those made of metal and those made of other material such as plastic.

Many other objects, as well as the advantages and uses of the invention, will be or should become apparent to those skilled in the art after reading the following description and claim and after viewing the drawings in which:

Fig. 1 is a view partly in section and partly in elevation showing a socket head cup-point set screw having a thread embodying a preferred form of the invention, the set screw being disposed in a shaft collar or the like having a bore with a standard thread therein, the set screw base or cup-point being engaged with a shaft shown in section, parts being broken away for convenience of illustration;

Fig. 2 is a large scale view in elevation of one-half of a slotted-head set-screw the thread of which has been formed according to the form of the invention illustrated in Fig. 1, the screw having been divided longitudinally at a diametral plane;

Fig. 3 is a view similar to that of Fig. 2 of one-half of a similar set-screw made with a modified form of thread embodying the invention;

Fig. 4 is a large scale view of a bolt and nut combination in which the bolt thread is "standard" or "normal" throughout but wherein the internal thread of the nut is formed after the manner of the thread of the set-screws of Figs. 1 and 2;

Figs. 5, 6, 7 and 8 are similar views, somewhat schematic in character, illustrating application of the principles of the invention to threaded studs in threaded bores to effect interlocking between male and female threaded members each of which has a portion of its thread formed after the manner taught by the invention; and Figs. 9 and 10 are diagramatic and Figs. 11 and 12 are geometric illustrations of relationships between standard or normal thread turns having predetermined pitch, crest and root diameters and a predetermined lead, and a variant turn of that same thread with different pitch, crest and root diameters and an increased or decreased lead.

Essentially and in a broad aspect the invention provides what may be termed "an interference fit" between a partial turn or a full turn or more of a predetermined section or portion of the thread of one or the other of a pair of members, such as a nut and a bolt having mating threads, and the interfitting or mating section or portion of the "normal" or standard thread on the other member. Considering a thread from a theoretical or basic dimension standpoint the invention may be briefly characterized in its application to "male" and "female" threaded members, as follows:

In a nut where the thread is internal or "female" the locking thread section or portion of the entire thread, whether a partial turn or a full turn or more, either has an increased lead phase or a decreased lead phase relative to the lead phase of the "normal" or "standard" section or portion of the thread, whether such "normal" or "standard" thread section or portion is a partial turn or a full turn or more, and also has decreased pitch, minor and major diameters relative to the corresponding diameters of the "normal" or "standard" section or portion of the thread. Where the thread is external or "male," as on a screw or bolt, the locking thread section or portion of the entire thread, whether a partial turn or a full turn or more, likewise has its lead phase inceased or decreased relative to the lead phase of the "normal" or "standard" section or portion of the thread which may consist of a partial turn or a full turn or more, but, in this case, such locking section or portion has increased pitch, major and minor diameters. Each lock portion of the thread, whether the thread is external or internal or in fit class 1, 2 or 3, is formed and dimensioned to bear such definite relationship to the corresponding form and dimensions of a standard or normal mating thread of its fit class, as to provide an interference fit between such lock thread portion and the mating portion of the mating standard thread.

The set-screw shown in Fig. 1 and there generally designated 13, has a head 14 provided with a socket the side-walls 15 of which form a hexagon for reception of a correspondingly formed key wrench and an engaging or securing end or cup-point 16 here shown as abutting against and biting into a shaft or the like 17 disposed in a collar 18, secured against movement relative to the shaft by the set screw. The collar 18 has been drilled and tapped to provide a normal or standard thread 19 of uniform pitch, major and minor diameters and of predetermined uniform lead throughout its length (measured along the crest of the helix). The thread crest and its root have flats or have been truncated after the usual specifications and, for purposes of simplification, the thread angle has been shown as sixty degrees. It is assumed, of course, that such internal thread has been so formed as to lie within the range of tolerances permissible for a thread of its particular fit class.

The set-screw also has a portion or section of its thread, in this case those turns designated 20(a), 20(b), 20(c) and 20(d), so formed as to mate with the thread 19 within such fit class as may be prescribed for the type of fit desired which, for present purposes, may be assumed to be class 2 or class 3. The thread on the set-screw, throughout its length over this portion or section, i. e., turns 20(a), 20(b), 20(c) and 20(d), is of uniform lead, pitch diameter and major and minor diameters and otherwise within the specifications required for a normal or standard thread to mate with the thread 19. Beginning with the turn 20(e) and starting at any circumferential point about the screw axis whether at the beginning or before or after the exact point or place of completion of the turn 20(d), the lead phase of the thread is decreased by a predetermined amount and, at the same time, the pitch and minor diameters are increased by a comparable predetermined amount. The amount by which the lead phase may be decreased and the amount by which the pitch and minor diameters may be increased for very satisfactory results are given in tables to follow hereinafter, but in any event should be sufficient to effect an "interference" or "jamb" fit with the opposed thread of the collar 18.

The decrease of lead phase and the increase of pitch and minor diameters of the screw preferably begin gradually, decrease and increase, respectively, at a substantially uniform rate, and reach a maximum at or about the end of a part turn (or one turn or more) from which point on the lead and the pitch and minor diameters remain substantially constant or uniform. In practice, however, and depending somewhat on the method of manufacture, it may not be practical to have the lead phase decrease and the pitch and minor diameters increase gradually and uniformly from zero change to maximum change; rather, as where the thread is formed by a "chaser," it may be necessary to effect these changes by a series of "steps" of relatively equal size so that the maximum change is reached in what amounts to a relatively gradual or uniform manner. It may also be observed that since the lead phase decrease (in this illustration—lead phase increase in other forms to be described) reaches a maximum quantity after a part turn or a full turn or more of a given thread and thereafter remains constant, each turn of the locking or "interference" portion or section of the thread will have the same lead phase, and preferably, the same pitch, major and minor diameters as the turn following and, likewise, the same lead although not the same lead phase as the part turn or more of the normal or standard portion or section of the thread although the last mentioned portion or section will have lesser pitch and minor diameters, the major diameter, in this instance, remaining substantially constant throughout both portions or sections. Maintenance of a uniform major diameter for the thread throughout the normal or standard and the locking or interference portions or sections while increasing the pitch diameter of the locking or interference portion or section also results in an increased width of flat at the thread crest (measured across the thread or parallel to the axis of the threaded member) as will be seen in both Fig. 1 and Fig. 2, where the scale is of a value sufficient to make the difference visual.

The effects of thus altering the lead phase and the pitch and minor diameters (in this instance the major diameter of turns 20(a) through 20(g) remains the same as above pointed out) become self-evident from Fig. 1. When the screw 13 is started in the threaded bore the normal or standard threads of both the screw 13 and collar 18 are gradually interengaged as under ordinary circumstances but as the locking or interference portion of thread of the screw begins to mate with the thread 19 of the bore it produces a wedging action, by reason of the change in lead phase, against the outwardly facing flank or side of the thread 19 tending to urge the screw longitudinally out of the bore and, simultaneously, the increased pitch and root diameters produce an outwardly directed wedging action (in a radial direction) tending to jamb the crest (and flanks) of the interference portion of the screw into the valley or root of the thread 19 of the bore to make a tight friction fit of the screw in the bore. The wedging action produced by the decreased lead phase tends to draw the outwardly facing flanks of the turns of the normal thread portion of the screw 13 tightly against the inwardly facing flanks of the turns of the thread 19 in the bore and the inwardly facing flanks of the turns of the normal thread portion of the screw away from the outwardly facing flanks of the turns of the thread 19, as indicated at 21 and 22, respectively, in Fig. 1. The wedging actions described are more or less progressive as the screw is driven deeper and deeper into the bore and in this embodiment, set up both tension forces tending to pull the screw apart in the direction of its axis and compression forces tending to squeeze or compress the screw in radial directions over the part having the locking or interference portion or section of the thread, a part which, in this case, may be considered to be the head of the screw. Comparable resultant forces are set up in the thread and body of the collar 18 which, in a direction parallel to the axis of the screw, and, in directions radially of the screw will be under compressive forces over that portion opposed to the interference portion of the screw thread. It is also probable that the collar about the bore is under tension circumferentially of the screw head.

The length of the screw and the lengths of the normal or standard and locking or interference portions or sections of the thread will be so chosen and proportioned as to provide the degree of locking effect desired when the screw is firmly engaged with the shaft to which the collar is to be secured. By varying the amount of lead phase decrease and the amount of increase in pitch and minor diameters, or the pitch diameter alone for the locking portion of the thread, it is possible to effect a relatively wide range of friction between mating threads for any thread fit class, as will be appreciated.

Fig. 2 represents a set-screw on a much greater scale than Fig. 1 and reveals somewhat more clearly the appearance of the thread in profile with approximately seven turns of a normal or standard thread portion or section embraced by the bracket 23 and, within the embrace of bracket 24, approximately two turns of a locking or interference portion attained by reduction of lead phase and increase of pitch and minor diameters, the major diameter being held constant throughout both portions or sections. Here, as above noted, the crest flats 25 of the turns of the locking portion are of greater width than the crest flats of the normal or standard turns, the root flat widths being held constant throughout by reason of increase of the minor diameter as well as the pitch diameter. As is well known, except in cases where a gas- or liquid-tight seal is to be effected, the minor diameter of an external or male thread is generally a more important or critical dimension than the major diameter while, in female or internal threads as in a nut, the major diameter is generally a more critical or important dimension than the minor diameter and such conditions hold true of the locking or interference thread of this invention. Where a gas- or liquid-tight seal is to be effected the major and minor diameters of both external and internal threads may all become important or critical. The several minor and pitch diameters and the uniform major diameter of the normal and locking portions of the thread of the screw of Fig. 2 are identified in respective order by reference numbers 27—28, 29—30 and 31.

The thread of the screw of Fig. 3 differs from that of Fig. 2 to the extent that here the major diameter 32 of the locking thread portion of two turns is greater than the major diameter 33 of the normal thread portion, the two locking turns being designated 34. These locking thread turns, like those previously described, have a decreased lead or change of lead phase relative to the threads 35 of normal construction, and have increased minor and pitch diameters as well as an increased major diameter, all designed to effect a gas-tight fit with a mating female thread in addition to effecting a lock therewith. The crest flats of the locking turns are designed to be substantially equal in width to the root flats of the mating thread and therefore can make tight contact therewith, preferably over at least one full turn to provide a gas-tight seal between that part of the mating crest surfaces.

Fig. 4 illustrates an application of the locking or interference principle to an internal or female thread. A screw or bolt 36, having a normal or standard thread throughout, carries a nut 37 the two turns 38 of the thread of which are made to provide an interference or locking fit by increasing (instead of decreasing) the lead phase and by decreasing the pitch and major diameters relative to the remaining or normal thread turns, from the normal or standard pitch and major diameters 39 and 40, respectively, to the new pitch and major diameters 39(a) and 40(a), respectively, the minor diameter 41 remaining constant throughout. Obviously, the minor diameter of the locking portion or section of this internal thread might also be decreased, after the manner in which the major diameter of turns 34 of the screw of Fig. 3 is increased, for the purpose of effecting a gas- or liquid-tight seal with the thread of the screw or bolt 36. Equally obvious should be the fact that the lead phase of the nut thread could be decreased instead of increased to obtain the same or a similar locking effect. Where the female thread lead phase is increased, as in the thread of the nut of Fig. 4, compression forces are set up in the nut tending to compress it in a direction parallel to the axis of the threaded bore and the screw is placed in tension in a corresponding manner and degree, whereas, if the lead phase of the nut thread were to be decreased the nut would be under tension forces tending to pull it apart in a direction parallel to the bore axis while a comparable corresponding compressive force would be affecting the screw engaged therewith.

Figs. 5 and 6, somewhat schematically represent combinations of studs and threaded bores in blocks or the like. In each figure the thread of the stud or stud member and the tapped or bore thread of the block member has an interference or locking portion or section in engagement with a normal or standard thread portion or section of the other member, thereby to increase the locking or securing action between the members. Fig. 5 reveals a combination in which certain of the thread turns, designated 42, adjacent to the bottom of the bore in the block member have a decreased lead and reduced major and pitch diameters relative to the normal or standard turns 43 of such thread at the upper or outer portion of the bore, and in which the stud thread turns 44 adjacent to the upper or outer portion of the bore have a decreased lead and increased pitch and minor diameters relative to the normal or standard turns 45 of that stud thread.

The heavy black lines in this figure define the upwardly facing flanks of the locking thread turns in the bore of the block member and the downwardly facing flanks of the locking thread turns of the stud member which flanks, it will be understood, are in contact engagement (in practice—for illustrative purposes to show actual contact would be confusing) with the opposed flanks of the normal or standard turns of the thread of the opposite or mating member. By reason of the wedging action created by the decreased lead of the locking threads on both stud and block members in Fig. 5, any and all normal or standard thread turns 43 and 45 lying between the zones of locking will be so urged or moved (as between the stud and block) as to tend to cause the upwardly or outwardly facing flanks of such turns on the stud to be drawn or pressed tightly against the inwardly or downwardly facing flanks of the opposed turns of the block. The small arrows point to those flanks of the normal or standard thread turns which engage or tend to engage in the arrangement shown in Fig. 5 and the large arrows indicate the relative directions in which the stud and block move or tend to move as a whole when the locking threads are engaged as pictured. In this case the stud will be subjected to compressive forces acting in an axial direction and the block will be subjected to tension forces acting in a parallel path but opposite direction after the manner of other exemplifications previously mentioned.

Fig. 6 is representative, after the manner of Fig. 5, of a stud member secured in a block member with two turns of the thread of each formed as a locking thread with an increased lead. Here again, the locking turns of the thread in the bore of the block member have decreased pitch and major diameters while the locking turns of the stud member have increased pitch and minor diameters, all relative to the normal or standard portions of the threads of the respective members. Also, as in other forms above described, a gas- or liquid-tight seal may be effected by decreasing the minor diameter of the locking turns of the block thread and/or increasing the major diameter of the locking turns of the stud thread. The heavy black lines and the small and large arrows have a significance in Fig. 6 similar to the corresponding symbols applied in Fig. 5. It is readily apparent, therefore, that the reaction effects of the locking thread turns will tend to draw the stud member downwardly in the bore and to effect compression in the stud and tension in the block.

Figs. 7 and 8 illustrate the effects of forming a locking thread turn with an increased lead on one of a pair of mating members and a locking thread turn with a decreased lead on the other of the pair, the locking construction otherwise corresponding to other forms above described and the symbols having similar significance as in previous figures. Here however the effects of having a decreased lead for a portion of the thread of one member and an increased lead for a portion of the thread of the mating member, is to tend to balance the stresses in each member (as indicated by the large arrows) and to dispose the normal or standard mating portions or sections of the threads which lie between the locking thread turn zones in a "neutral" position with respect to one another so that any normal clearance between their mating flanks will be equalized, more or less, between opposite and opposed flanks.

Figs. 9 and 10 diagrammatically illustrate decreased (Fig. 9) and increased (Fig. 10) lead of a thread turn with either increased (male or external thread) or decreased (female or internal thread) pitch, major and minor diameters. The perpendicular distance between the parallel dot-dash vertical lines in each of these figures is the measure of the maximum lead increase or decrease relative to the normal or standard thread portion, the dot-dash lines being perpendicular to the axis of the thread of the member on which the thread is formed and passing through the apices of the thread angles of the normal or standard threads (full lines) and the thread angles of the full locking thread (dotted lines). It will be observed from each of Figs. 9 and 10 that each of the dotted sloping lines extends parallel to the thread flank to which it is adjacent, from point of intersection of that one of the pair of parallel dot-dash lines which does not pass through the normal or standard thread angle apex with the opposite thread flank, thereby defining a new thread angle apex giving an increased minor (male thread) or decreased major (female thread) diameter for the theoretical thread root of the locking turn portion. The upper end of the dotted line in each example intersects a projection of the opposite thread flank thereby defining a new crest giving an increased major (male thread) or decreased minor (female thread) diameter for the theoretical thread crest of the locking turn portion. In practice, in most cases, the roots and crests of threads are truncated and do not terminate in the sharp angles as illustrated in Figs. 9 and 10 purely for simplification of explanation. While it might otherwise appear or be assumed, the lead of the locking turns, after attaining a predetermined maximum increase or decrease, remains constant and the distances measured parallel to the helix axis between corresponding points of adjacent crests, for instance, of both standard and locking turns will be the same throughout, except for the distance between the last standard turn crest and the first locking turn crest when the maximum change in lead or lead phase is attained in one thread turn or less.

Thus, as Figs. 9 and 10 make clear and as Fig. 11 (hereinafter explained) will also make apparent, one flank of every turn of every male or female thread will be a uniform helix from end to end over both the standard or normal thread turn portion and the interference or locking turn portion, whereas, the opposite flank of the interference or locking turn portion (whether less than a turn or a turn or more) will depart from the uniform helix of the corresponding flank of the normal or standard turns at the beginning part thereof by the amount of increased or decreased lead that may be desired or required to give the interference or lock described, such flank of the locking or interference portion thereafter continuing uniformly in the new helical path. Of course, there may be an unthreaded part or portion between the normal or standard thread turns and the locking or interference thread turns but the principle will ordinarily remain the same so far as the corresponding flank helices are concerned. As stated, once one of the flanks of the locking or interference portion has been changed to the maximum of its increased or decreased lead it again becomes a uniform helix from there on but is "out of phase," so to speak, with the helix of the corresponding flank of the standard or normal portion of the thread turns.

Determination of the amount of lead increase or decrease and the change in pitch, major and minor diameters to be effected to obtain a desired degree of locking for a particular type, size and fit class of thread, may be calculated from technical data readily available and well known to those skilled in this art when taken with the disclosure hereof. By reference to the geometric diagrams, Figs. 11 and 12, and to the following data tables which have been found useful in practice for certain thread sizes where the thread angle is sixty degrees (half angle thirty degrees), even those relatively unskilled in the art should be able to practice the invention.

Fig. 11 represents a normal or standard thread turn S and a locking turn L the lead of which is to be decreased by an amount X. The value of X, preferably, depends upon and bears a certain relationship to the fit class of the thread and the degree of locking security desired or required.

It has been found, for instance, that for the machine screw numbers or nominal sizes (American National coarse and fine thread series) listed in Tables 16 and 24 on pages 47 and 60–61, respectively, of the aforesaid "handbook" and for thread fit classes 2 and 3, if the pitch diameter of the thread should be increased (male) or decreased (female) by 0.001 inch and the lead is increased or decreased in definite ratio to that increase or decrease in pitch diameter, a very satisfactory lock and, where required, gas- or liquid-tight seal, may be effected. To illustrate by example, if, as in Fig. 11, a line $p,d$, perpendicular to the thread axis, is erected from the apex or crest $p$ of the normal thread profile and has a scale value of 0.001 inch or the desired increase in pitch diameter, then by drawing a straight line $p',r'$ parallel to the normal thread flank from $d$ to a point of intersection with the adjacent thread flank $r,n$, the apex $r'$ of the locking thread turn root will be established. Line $p,p'$ a projection of the flank opposite to flank $p,r$, and lines $p',t$, $o,r$ and $o'',r'$ perpendicular and lines $p,t,c$, and $o',m,r'$ parallel to the thread axis, are drawn as shown in Fig. 11. The lines $o,r$ and $o'',r'$ bisect the thread angles $p,r,n$ and $c,r',n$, respectively. By geometry it may be proved that the triangle $p,d,p'$ is an isosceles triangle the apex $p'$ of which equally divides the hypotenuse of the right triangle $d,p,c$, that the triangle $p,c,p'$ is equilateral, that $p',t$ is equal to one-half of $p,d$ and also equal to the perpendicular distance between the parallel lines $p,r$ and $p',r'$ that $p',t$, $m,o$ and $m,r$ are equal to one another, and that $p,t$, $t,c$, $o',m$ and $m,r'$ are equal to one another and each equal to the increase or decrease in lead.

Now, if the pitch diameter is to be increased or decreased by 0.001 inch and is represented by $2y$, then $y=0.0005$ inch which is equal to $p't$ and to $m,r$. Consequently, as will be appreciated, the value of $m,r'$, or increased or decreased lead, may be represented by "$x$" in the equation $x=y$ times the tangent of the angle $m,r,r'$, the angle $m,r,r'$ being thirty degrees or one-half of the thread angle of sixty degrees in this case. Thus $$x=0.005\times 0.57735$$

or $x=0.000288675$ inch. If the major diameter of a male or external thread, as in a screw, or the minor diameter of a female thread, as in a nut, is to be constant throughout the normal or standard and locking turns of the thread, then the crest flat $p,t,c$ may be represented by "$a$" in the equation $a=2x$ or $a=2y$ times the tangent of one-half of the thread angle. In the example of values given above "$a$" will then be equal to 0.00057735 inch. The perpendicular distance between $p,r$ and $p',r'$ will be $y$ or 0.0005 inch.

The following illustrative tables "A" and "B" give the values for "$x$" and "$y$" based upon thread specifications shown in Tables 16 (pages 47–48) and 24 (pages 60–61) of the above named "handbook," it being understood that the values of "$x$" and "$y$" in table "A" also include allowance for the effect of the difference (clearance) between the standard maximum pitch diameters of each given nut size and corresponding screw for male or external threads, and that the values of "$x$" and "$y$" in table "B" include allowance for the effect of the difference (clearance) between the standard minimum pitch diameters of each nut and screw of a given size for female or internal threads.

TABLE "A"

*External or male threads*

[This table indicates the method of computing values "$2y$," "$y$" and "$x$" in above formula and the values of "$2y$," "$y$" and "$x$" for each of a number of common screw sizes. The p. d. increase of 0.001 inch in the difference is more or less arbitrary but has been found to give excellent results in practice.]

| Class 2 [1] Size | Standard Max. p.d. (nut) | Standard Max. p.d. (screw) | Difference +0.001 [2] or $2y$ | ½ (difference +.001) or $y$ | "$y$"×tan. 30° or "$x$" [3] |
|---|---|---|---|---|---|
| 6-32 | .1204 | .1177 | .0037 | .00185 | .00107 |
| 8-32 | .1464 | .1437 | .0037 | .00185 | .00107 |
| 10-24 | .1662 | .1629 | .0043 | .00215 | .00124 |
| 10-32 | .1724 | .1697 | .0037 | .00185 | .00107 |
| ¼-20 | .2211 | .2175 | .0046 | .00230 | .00133 |
| ¼-28 | .2299 | .2268 | .0041 | .00205 | .00118 |
| ⁵⁄₁₆-18 | .2805 | .2764 | .0051 | .00255 | .00147 |
| ⁵⁄₁₆-24 | .2887 | .2854 | .0043 | .00215 | .00124 |
| ⅜-16 | .3389 | .3344 | .0055 | .00275 | .00159 |
| ⅜-24 | .3512 | .3479 | .0043 | .00215 | .00124 |
| ⁷⁄₁₆-14 | .3969 | .3911 | .0059 | .00295 | .00170 |
| ⁷⁄₁₆-20 | .4086 | .4050 | .0046 | .00230 | .00133 |
| ½-13 | .4552 | .4500 | .0062 | .00310 | .00179 |
| ½-20 | .4711 | .4675 | .0046 | .00230 | .00133 |

EXPLANATION

[1] While Class 2 fit data has been used as a basis for computing the increased pitch diameter ($2y$) of locking thread turns for certain common types and sizes of male or external threads of screws, bolts and the like, the same computations and values of "$2y$," "$y$" and "$x$" are fully effective, ordinarily, for male or external threads having a Class 3 fit.
[2] This is the increase to be effected in the pitch diameter ($p$, $d$).
[3] This is the lead increase or decrease to be effected for external lock thread.

TABLE "B"

*Internal or female threads*

[This table indicates the method of computing values "$2y$," "$y$" and "$x$" in the above formula and gives the values of "$2y$," "$y$" and "$x$" for each of a number of common nut or the like (internal) thread sizes. The p. d. decrease of 0.001 inch in the difference is more or less arbitrary but has been found to give excellent results in practice.]

| Class 2 [1] | Standard Min. p.d. (screw) | Standard Min. p.d. (nut) | Difference −.001 [2] or $2y$ | ½ (difference −.001) or $y$ | "$y$"×tan. 30° or "$x$" [3] |
|---|---|---|---|---|---|
| 6-32 | .1150 | .1177 | .0037 | .00185 | .00107 |
| 8-32 | .1410 | .1437 | .0037 | .00185 | .00107 |
| 10-24 | .1596 | .1629 | .0043 | .00215 | .00124 |
| 10-32 | .1670 | .1697 | .0037 | .00185 | .00107 |
| ¼-20 | .2139 | .2175 | .0046 | .00230 | .00133 |
| ¼-28 | .2237 | .2268 | .0041 | .00205 | .00118 |
| ⁵⁄₁₆-18 | .2723 | .2764 | .0051 | .00255 | .00147 |
| ⁵⁄₁₆-24 | .2821 | .2854 | .0043 | .00215 | .00124 |
| ⅜-16 | .3299 | .3344 | .0055 | .00275 | .00159 |
| ⅜-24 | .3446 | .3479 | .0043 | .00215 | .00124 |
| ⁷⁄₁₆-14 | .3862 | .3911 | .0059 | .00295 | .00170 |
| ⁷⁄₁₆-20 | .4014 | .4050 | .0046 | .00230 | .00133 |
| ½-13 | .4448 | .4500 | .0062 | .00310 | .00179 |
| ½-20 | .4639 | .4675 | .0046 | .00230 | .00133 |

EXPLANATION

[1] While Class 2 fit data has been used as a basis for computing the decreased pitch diameter ($2y$) of certain common types and sizes of female or internal threads of nuts and the like, the same computations and values of "$2y$," "$y$" and "$x$" are fully effective, ordinarily, for female or internal threads having a Class 3 fit.
[2] This is the decrease to be effected in the pitch diameter ($p$, $d$) for internal lock thread.
[3] This is the lead increase or decrease to be effected for internal lock thread.

Thus, as will be evident from the foregoing Tables A and B, the increase or decrease (change) to be effected in the pitch diameter of the screw is equal to $k+P_1-P_2$, where $k$ is a value of up to about 0.001 inch for fit classes 2 and 3, $P_1$ is the standard maximum allowable pitch diameter of an internal thread of the same fit class when the lock turn is external, as in Table A, and the standard minimum allowable pitch diameter of an internal thread of the same fit class when said lock turn is internal, as in Table B, and $P_2$ is the standard maximum allowable pitch diameter of an internal thread of the same fit class when the lock turn is external, as in Table A, and the standard minimum allowable pitch diameter of an external thread of the same fit class when the lock turn is internal, as in Table B. It is also evident from Tables A and B that a constant, as $f$, may be used to indicate whether the pitch diameter is to be increased or decreased b ythe above difference depending on whether the lock turn is upon an external or male thread or an internal or female thread. Thus, it is further evident that pitch diameter of the lock turn, which results from the increase in the pitch diameter as recommended in Table A or the decrease in Table B, is the original basic pitch diameter increased or decreased (as the case may be) by the difference $f(k+P_1-P_2)$, and therefore the changed pitch diameter of the lock turn, according to Tables A and B, may be defined as equal to $B+f(k+P_1-P_2)$, when $f$ is $+1$ for an external lock thread and $-1$ for an internal lock thread.

The locking thread whether less than a full turn or a turn or more may be applied to internal and external threads of articles where the thread fit is class 1, following the teaching of the foregoing disclosure including the examples given. In such case, however, because of the greater tolerances allowable, i. e., looseness, the amount of increase (external) and decrease (internal) in pitch diameter for screws and nuts, respectively, and the amount of lead increase or decrease for either, will be increased by an amount substantially proportioned to the increase in tolerance. It has been found in practice that an increase or decrease in pitch diameter of from 0.0015 inch to 0.0020 inch for class 1 fit threads, depending upon the degree of lock required, will give very satisfactory locking results in most cases.

It will be appreciated that the invention has many advantages and uses not a few of which are unique and some of which have been mentioned above. The manufacture of screws, nuts and the like with a locking feature of the character of that of the invention is relatively simple and inexpensive particularly when made in automatic screw machines using thread chasers and taps ground to make the locking thread with its increased or decreased lead and increased (screw) and decreased (nut) pitch diameter. One of the greatest advantages resides in the fact that the increased or decreased lead results in drawing or urging the standard or normal thread flanks together throughout all or substantially all of the thread helix so that in a set-screw for instance, neither the inner part nor the outer part of the screw can "wiggle" or move, as is a common fault of present types of so-called self-locking set-screws.

While preferred forms of the invention have been illustrated and described, the invention principles are susceptible of embodiment in various other forms and of use in many other ways. We desire to be limited only by the invention spirit and the scope of the appended claim.

We claim:

An internally threaded first member for threaded mating engagement with an externally threaded second member of the same fit class within fit classes 1, 2 and 3, the thread on the first member including two sections, one of the sections comprising a standard thread turn, the second of the sections comprising a lock turn in mechanical continuity with and running in the same direction as the turn of the first section and having a lesser pitch diameter than that of the turn of the first section and a decreased lead phase, the profile of the thread being uniform throughout both of the said sections, the difference in pitch diameter of the thread of the second section relative to the basic pitch diameter of the said standard thread turn of the first section being a predetermined amount equal to the sum of the difference between the minimum allowable pitch diameter of a standard internal thread of the same fit class as the first member and the minimum allowable pitch diameter of a mating standard external thread of the same fit class as the first member and an amount up to about 0.002" to give a locking interference fit with the second member.

References Cited in the file of this patent
UNITED STATES PATENTS

| | | |
|---|---|---|
| 1,957,784 | Johnson | May 8, 1934 |
| 2,387,375 | Whyland | Oct. 23, 1945 |
| 2,437,638 | Evans | Mar. 9, 1948 |

FOREIGN PATENTS

| | | |
|---|---|---|
| 567,770 | Great Britain | Mar. 1, 1945 |